United States Patent [19]

Ulrich

[11] Patent Number: 5,501,498
[45] Date of Patent: Mar. 26, 1996

[54] METHODS AND APPARATUS FOR MECHANICALLY INTELLIGENT GRASPING

[75] Inventor: Nathan T. Ulrich, Philadelphia, Pa.

[73] Assignee: The Trustees of the University of Pennsylvania, Philadelphia, Pa.

[21] Appl. No.: 255,123

[22] Filed: Jun. 7, 1994

Related U.S. Application Data

[63] Continuation of Ser. No. 63,125, May 13, 1993, abandoned, which is a continuation of Ser. No. 798,015, Nov. 20, 1991, abandoned, which is a continuation of Ser. No. 596,572, Oct. 11, 1990, abandoned, which is a continuation of Ser. No. 520,714, May 8, 1990, abandoned, which is a division of Ser. No. 239,187, Aug. 31, 1988, Pat. No. 4,957,320.

[51] Int. Cl.⁶ .................................................. B25J 15/10
[52] U.S. Cl. .......................... 294/106; 294/111; 294/907; 901/36; 901/39
[58] Field of Search ................................ 294/104, 106, 294/111, 907; 901/30–34, 36, 39, 21, 25, 45, 46; 623/57, 63, 64; 192/56 R

[56] References Cited

U.S. PATENT DOCUMENTS

| | | | |
|---|---|---|---|
| 3,694,021 | 9/1972 | Mullen | 294/106 |
| 3,866,966 | 2/1975 | Skinner, II | 901/36 X |
| 3,901,547 | 8/1975 | Skinner, II | 901/36 X |
| 3,927,424 | 12/1975 | Itoh | 294/106 X |
| 3,927,1424 | 12/1975 | Itoh | 294/106 X |
| 4,272,973 | 6/1981 | Fu-Tsai | 192/56 R X |
| 4,350,381 | 9/1982 | Hellmann | 901/33 X |
| 4,598,942 | 7/1986 | Shum et al. | 901/31 X |
| 4,621,331 | 11/1986 | Iwata | 294/907 X |
| 4,623,183 | 11/1986 | Aomori | 294/106 X |
| 4,643,473 | 2/1987 | Douglas | 294/111 |
| 4,653,793 | 3/1987 | Guinot et al. | 901/31 X |
| 4,655,479 | 4/1987 | Farr, Jr. | 192/56 R X |
| 4,746,894 | 5/1988 | Zeldman | 901/33 X |
| 4,865,376 | 9/1989 | Leaver et al. | 901/36 X |
| 4,921,293 | 5/1990 | Ruoff et al. | 294/106 X |
| 5,108,140 | 4/1992 | Bartholet | 294/106 |

FOREIGN PATENT DOCUMENTS

| | | | |
|---|---|---|---|
| 232681 | 2/1986 | Germany | 294/907 |

*Primary Examiner*—Dean Kramer
*Attorney, Agent, or Firm*—Woodcock Washburn Kurtz Mackiewicz & Norris

[57] ABSTRACT

An improved robotic end effector is disclosed. The end effector of the present invention possesses a novel breakaway clutch, which is combined with mechanically linked finger joints to significantly reduce control complexity while retaining the ability to accomplish enveloping grasps. In another embodiment, a finger using compliant tendons to accomplish enveloping grasps is disclosed. A novel palm/finger configuration which further increases the versatility of the disclosed end effector without unduly increasing complexity is also disclosed. Methods of manipulating an object are also disclosed.

17 Claims, 6 Drawing Sheets

METHODS AND APPARATUS FOR MECHANICALLY INTELLIGENT GRASPING

This is a continuation of application Ser. No. 08/063,126, filed May 13, 1993, now abandoned, which is a continuation of application Ser. No. 07/798,015, filed Nov. 20, 1991 now abandoned, which is a continuation of application Ser. No. 596,572, filed Oct. 11, 1990, now abandoned which is a continuation of application Ser. No. 520,714, filed May 8, 1990 now abandoned, which is a division of application Ser. No. 239,187, filed Aug. 31, 1988 (now U.S. Pat. No. 4,957,320, issued Sep. 18, 1990).

FIELD OF THE INVENTION

The present invention relates to the field of robotic systems. More specifically, the present invention comprises apparatus related to end effectors and related systems used to manipulate objects.

BACKGROUND OF THE INVENTION

The growing emphasis on competitiveness and efficiency in the industrial marketplace has brought about dramatic changes in the methods by which a variety of production tasks are performed. An ever increasing number of robotic systems are finding a place in the production cycle of nearly every conceivable good produced. From the handling of raw materials, to the production of goods themselves, to storage and shipment, the flexibility of robotic systems has made an impact and created a new standard of efficiency.

Despite the phenomenal progress of robotic systems within the last twenty years, the potential for further improvement and growth is seemingly unlimited. One area of paramount importance is the design of end effectors. End effectors are usually understood to be that portion of a robotic system which interacts with the environment. Since most industrial robotic systems may be loosely classified as "arms", end effectors may be said to represent robotic "hands". Generally, end effectors are independently controllable and, as such, are used to manipulate a tool, or may be used to manipulate a work piece, part, or material. An end effector is also the ideal tool to gain information about an environment and the objects to be manipulated. Ideally, an end effector should be able to perform a variety of tasks by simply changing the programming instructions which control its movements. In practical terms however, this is not feasible because end effectors operate within a large range of loading and spatial precision requirements, as well as a variety of environmental conditions. As the complexity of robotic systems and the tasks they are asked to undertake grows, the improvement of the devices which allow them to affect and learn about their environment increases in importance.

As the science of robotics progresses, truly programmable systems must be created which can approach an unknown environment and undertake a variety of tasks. Such systems will allow exciting new applications in outer space, hazardous environments, military applications, and undersea exploration. Robotics will thus move from the industrial sphere to the more general goal of reducing the labors and dangers encountered in performing a variety of tasks within an undefined environment.

Existing end effectors can be divided into two broad categories. The end effectors in the first of these categories may be described as complex multi-fingered hands. These are characterized by the ability to undergo precise fingertip movements, and have been successful in achieving an ability to handle small objects with precision, dexterity, and controlled grasping force. This category includes attempts to design anthropomorphic hands which seek to replicate the movements of the human hand. However, end effectors in this first category suffer from limited strength, fragile construction, and undue complexity-drawbacks which reduce their effectiveness as useful equipment in demanding environments. The second class of end effectors comprises the well known simple grippers found in most industrial robotic systems, as well as somewhat more complex devices. These devices are strong and robust, capable of carrying useful payloads and performing reliably. However, the structural and control system simplicity inherent in these designs necessarily limits their adaptability to a variety of tasks; most are considered useful for a single purpose, such as welding, painting, drilling, part insertion, or material transfer. The cost incurred in the design and construction of a specialized end effector, and the inefficiency involved in changing between them, frequently presents a major drawback to the optimal implementation of robotic systems.

Examples of complex multi-fingered hands are described in Salisbury, J. Kenneth, *Robot Hands and the Mechanics of Manipulation*, The MIT Press, Cambridge, Mass. (1985); and Jacobsen, S., et al. "Design of the Utah/MIT Dexterous Hand", Proceedings of the IEEE Conference on Robotics and Automation (1986); both of which are incorporated herein by reference.

The Salisbury hand contacts an object with three fingertip contacts and relies on frictional constraints and force feedback to provide a stable grasp. The configuration is derived from the results of a numerical analysis of possible hand designs. From these results, a hand comprised of a combination of three fingers with three rotational joints per finger was developed. This device has the capability to perform fingertip manipulation of small objects—a one inch sphere was chosen as a typical example— and can be programmed for small parts motion.

The Utah/MIT hand essentially duplicates the human hand. Although it has only four fingers, each finger is designed with four joints and anthropomorphic geometry. This design is extremely costly and requires very complicated control techniques and hardware. Thus, this design is limited to an advanced research environment.

The second category of end effectors, simple one and two degree-of-freedom grippers, are the most commonly used end effectors in both research and industry. A description and illustrations of examples of these grippers may be found in Coifett, P. and Chirouze, M.; *An Introduction to Robot Technology*, McGraw-Hill (1982), which is incorporated herein by reference, particularly at pp. 159–163. Although these grippers have limited versatility, they are generally robust and economical. In practice, object variation requires a specialized end effector for each application.

In an effort to reduce the complexity of the control systems of robotic fingers, as well as reducing the number of actuators, designs have been proposed which feature joints which are rigidly coupled. Rigid coupling between joints defines a single set of joint angles for each actuator displacement. For example, if two joints are coupled by pulleys with radii of $r_1$ and $r_2$, the joint displacements $\phi_1$ and $\phi_2$ are defined by the relation:

$$\frac{\phi_1}{r_1} = \frac{\phi_2}{r_2}$$

An example of a finger having coupled joints may be found in U.S. Pat. No. 4,865,376—Leaver et al., which is assigned to the same entity as the present application and is incorporated herein by reference. Leaver et al. discloses a three-joint finger having two actuators, as well a proposed method of representing and optimizing fixed, rigid couplings between joints by using a matrix method of representing the cable routings used to create such couplings. The joints of Leaver maintain a known ratio between the joints and thus are limited in the class of objects which may be enclosed in their grasp.

The placement of fingers relative to a palm can also play a role in the manipulation of objects, as set forth in U.S. Pat. No. 3,866,966—Skinner, II. The three fingered hand disclosed by Skinner, II uses a palm structure which allows the fingers 12,12a,12b to be rotated about an axis which is coincident with the base link of the finger. Thus the palmar surfaces of the fingers, those which generally face toward the palm and together with it close around an object, may be "turned" relative to each other, but the base of the finger remains fixed in a single position relative to the palm. Although Skinner thus provides a rotational degree of freedom for each finger, it is not possible to translate position of the fingers relative to the palm, thereby allowing a variety of cooperating and/or opposing orientations to be achieved.

Thus, it can be seen that there exists an unfulfilled need for a device which combines the simplicity, robustness, and ease of control characteristics found in simple grippers, while also possessing the versatility and dexterity of the more complex multi-fingered hands. Therefore, it is an object of the present invention to provide a class of end effectors possessing greater degrees of freedom and versatility than existing grippers, while further providing the robustness, utility and economical construction not found within available multi-finger hand designs.

It is desirable to provide designs for robotic hands which possess a sufficient number of degrees of freedom between the fingers and palm to enable a variety of grasps to be accomplished. The actuators for each joint should be placed at or near each joint for simplicity and to reduce the complexity and inefficiency in power transmission. It is therefore advantageous to reduce the number of actuators needed to effect a particular grasp geometry. Accordingly, it is an object of this invention to provide palm/finger/actuator configurations which maximize the variety of grasps and dexterity available, while minimizing the number of actuators. It is a further object of the present invention to allow the fingers used in the hand of the present invention to be capable of being positioned in a variety of orientational positions relative to the palm to which they are attached.

In order to execute a firm grasp, an articulated member such as a robotic finger should be capable of being "wrapped" around an object. It is further desirable that this function be executed with little prior knowledge of the shape of the object being grasped and without actively controlling the joints in a servo loop. Thus, a further object of the present invention is to provide articulated members which comply with the shape of an object to provide a firm, enveloping grasp. It is also an object of the present invention to provide articulated members which rely on mechanical intelligence to execute this function, rather than requiring a series of joint actuation control commands.

The attempted grasp of an object may fail due to the varied spatial orientation of the object affecting the stability of the grasp. It is a further object of the present invention to provide apparatus for manipulating an object fitted with tactile sensors which can determine grip stability. It is yet another object of the present invention to present methods whereby the information collected by tactile sensors may be utilized to adjust the orientation of the apparatus to achieve a stable grasp.

It is also an object of certain embodiments of the present invention to provide fingers which possess a degree of compliance upon executing a closing grasp, yet remain rigidly resistive to the opposing force they encounter.

Summary of the Invention

These and other objects of the present invention are achieved by a robotic hand comprised of a palmar surface and at least one articulated member. In a preferred embodiment, there are three articulated members, two of which are rotatably attached to the palm such that they are capable of changing their relative position about the perimeter of the palm. These two members are driven by a single actuator and their motion is linked so as to be equal and opposite. The third articulated member remains stationary. All three members are capable of independent manipulation, in terms of opening and closing, via independent actuators to which they are attached.

An important aspect of the present invention is the provision of compliance in the joints of the articulated members, which allows the members to "wrap" around an object. In a most preferred embodiment, a worm gear and clutch mechanism are provided which allows a joint to "breakaway" at a pre-determined level of torque, which may be remotely adjusted, thereby allowing another joint to continue to be driven. In another embodiment, this compliance is provided by means of a spring or other resilient means which forms a part of the tendon and pulley power transmission system of this embodiment.

The present invention also provides methods whereby an object may be grasped by a repetitive method which does not require detailed prior knowledge of an object's shape to execute an enveloping grasp. This method comprises steps whereby grip stability is determined by tactile sensors and upon a determination that a grip is unstable, the grasping apparatus is re-positioned and stability is again determined. The information collected is thus utilized to learn about an objects spatial characteristics with each attempt

DETAILED DESCRIPTION OF THE PREFERRED EMBODIMENT

Figure 1:
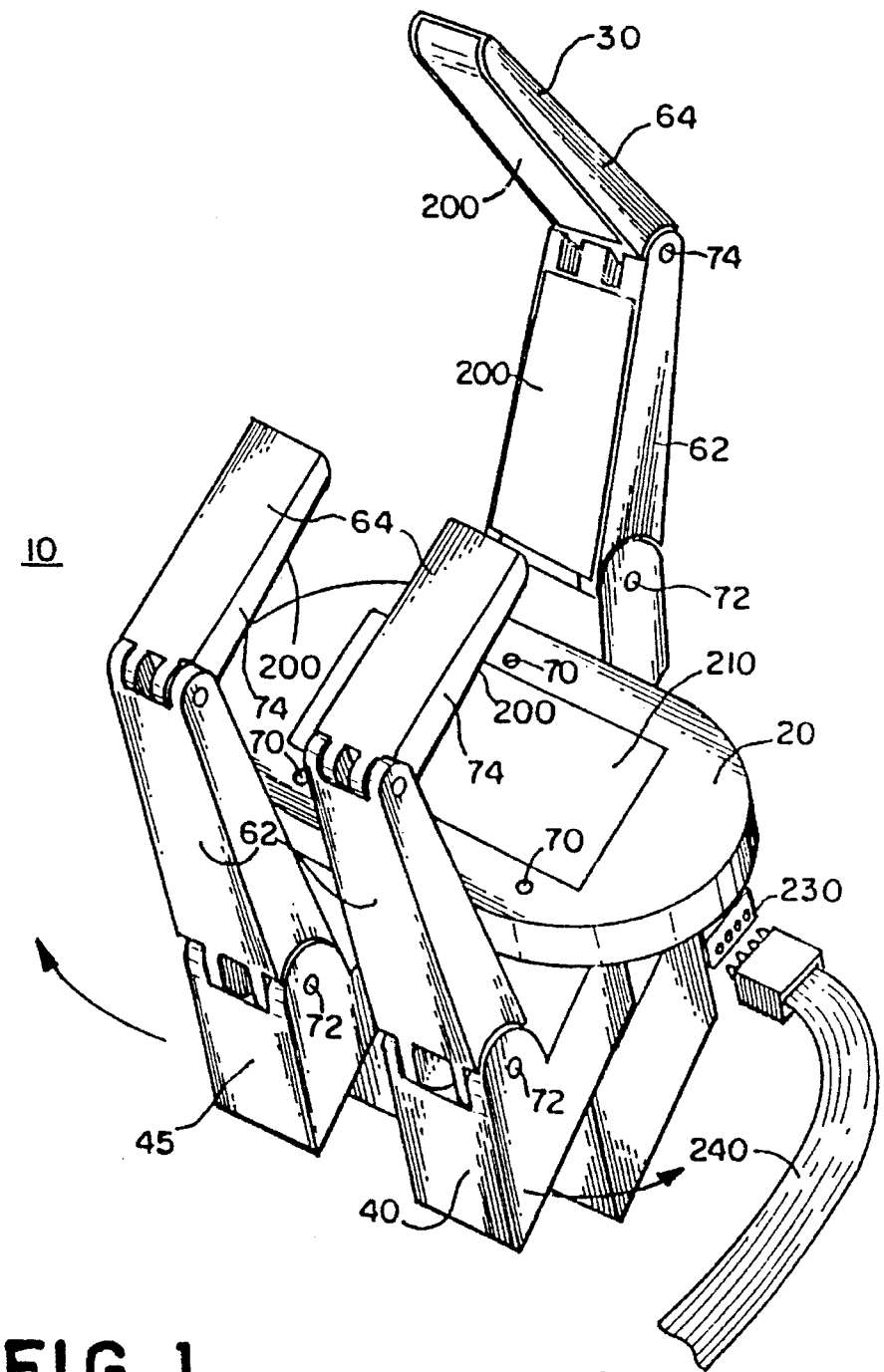
FIG. 1 is a perspective view of a robotic hand constructed in accordance with the present invention.
Figure 1:
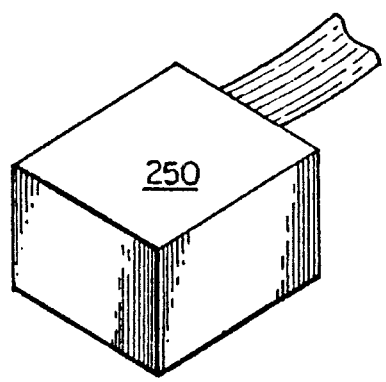

Referring now to FIG. 1 a robotic hand assembly made in accordance with the present invention is shown generally at 10. The robotic hand assembly 10 includes a palm 20, a substantially stationary finger 30, a first rotatable finger 40 and a second rotatable finger 45. All three fingers 30,40,45 are connected to palm 20. As shown by the arrows in FIG. 1, the rotatable fingers 40,45 have the ability to be driven about their respective palm axes 70. In accordance with one aspect of the present invention, the rotatable fingers 40,45 are each driven by a single actuation means 80, not visible in this view, and are mechanically linked such that their relative motion about the palm 20 is equal and opposite. The substantially stationary finger 30, does not rotate about its palm axis 70. However, all three fingers 30,40,45 may be independently manipulated toward the palm 20 to execute a grasp.

Figure 2:
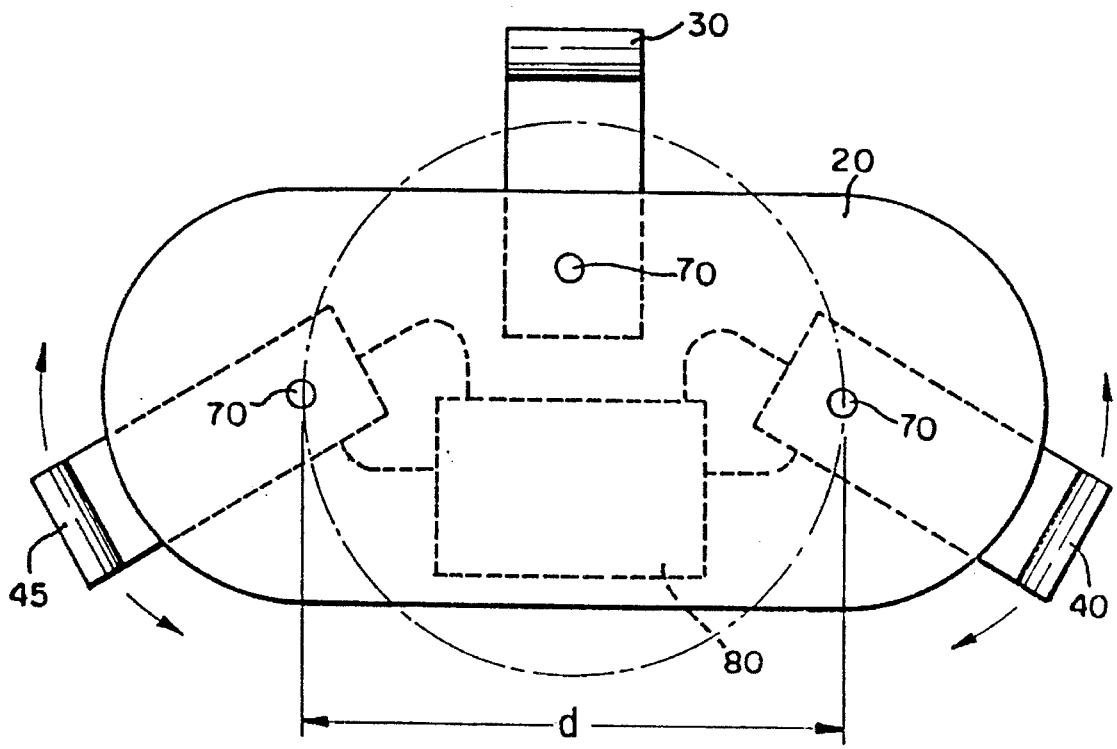
FIG. 2 depicts a plan view of the finger junctions and the palm/finger configuration of the present invention.

The palm 20 which is connected to the fingers 30,40,45 can be described as a junction of serial linkages. The arrangement of the fingers 30,40,45 about the palm 20 is illustrated in FIG. 2. This arrangement has been optimized to provide an arrangement whereby the distance between the points of attachment to the junction has been selected so as to allow each link to be parallel with the links on either side of it. One of ordinary skill will appreciate that this condition is useful for executing a variety of grasps. If a circle of radius d is passed through the center of rotation of each point of attachment between a finger and the palm, for fingers having links of width w, the diameter of a circle which permits the links to be parallel can be described by the equation:

$$d \leq \frac{w}{2 \sin (\theta/2)} + w_s$$

where $\theta = 2\pi/n$ and n is the number of fingers which rotate about their zeroth link, in this case, the palm axis 70 and $w_s$ is the width of any stationary finger placed within the palm configuration. Since in a preferred embodiment, the number of rotatable fingers 40,45 is two, n=2. The distance between rotational centers of the fingers is controlled by the equation for d. In a preferred embodiment, a third, non-rotating finger 30 is added to the configuration in order to increase grasping versatility. One of ordinary skill will realize that any number of fingers may be spaced around such a circle and, by using this equation their links will be parallel at a certain limit of motion. It is further appreciated that the addition of non-rotating fingers, fixed posts or plates, or other apparatus, such as illustrated by a preferred embodiment, allows a great variety of useful hand configurations to be obtained.

Figure 3:
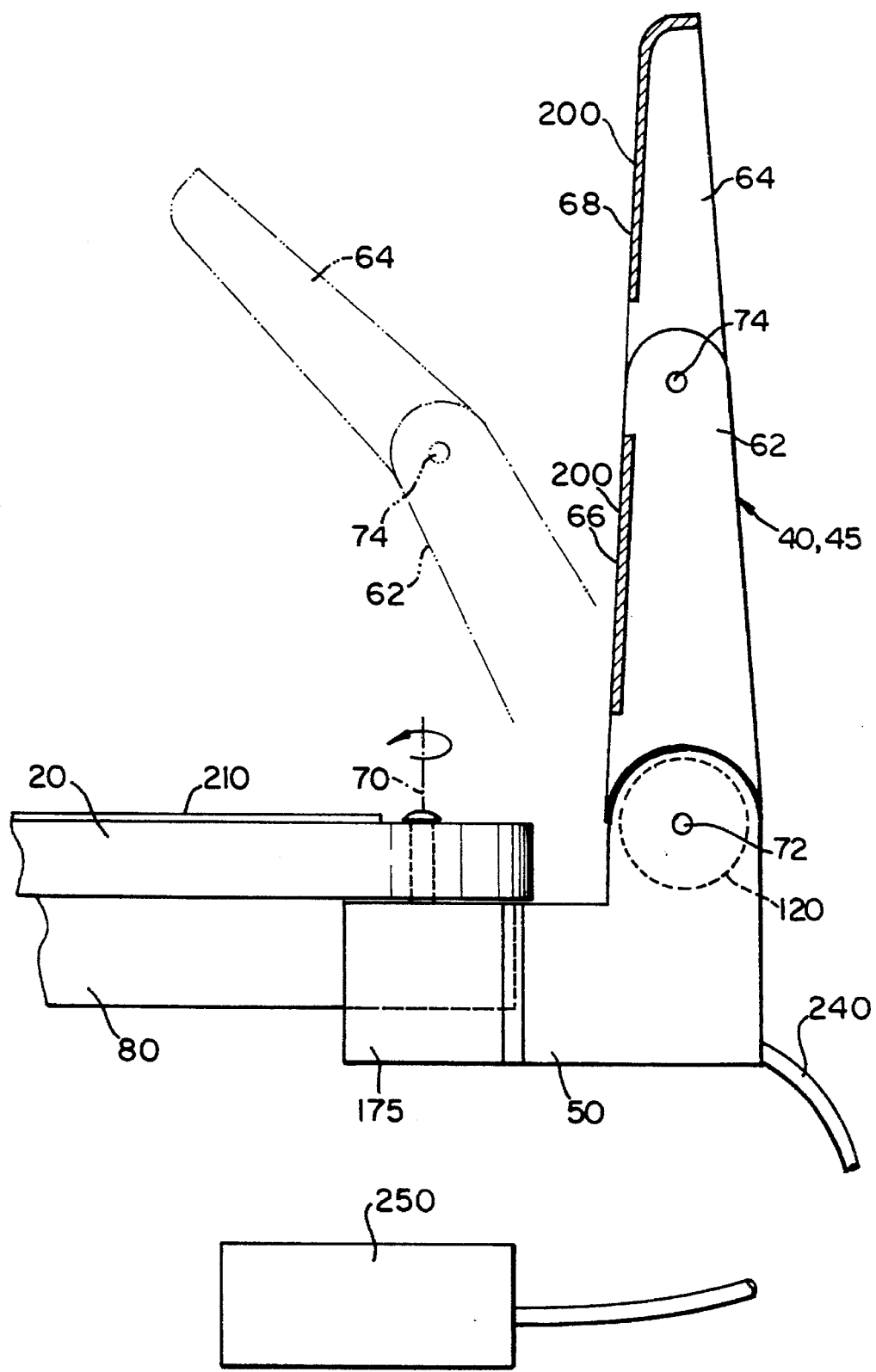
FIG. 3 is a partially broken away side view of a robotic finger and drive means made in accordance with the present invention.

Referring to FIG. 3, each finger assembly 30,40,45 is attached to palm 20 via palm axis 70. In the case of the rotatable fingers 40,45 illustrated in FIG. 3, the palm axis 70 allows rotation of the finger assembly about its axis, thereby changing both the relative orientation of the palmar surface, which is defined as the surface 66,68 of the links 62,64 of the finger which face the palm 20, and the relative location between the finger and the palm. Each finger 30,40,45 is individually manipulated via a its own grip drive means 50. In a preferred embodiment of the hand of the present invention there are three grip drive means 50, one for each finger. A fourth drive means, the grasp drive means 80, is used to rotate the moveable fingers 40,45 about their respective palm axes 70. Each grip drive means 50 is mechanically connected to a finger. In a preferred embodiment, the means for transferring torque from grip drive means 50 to a first finger joint 72 is a worm wheel 120. A worm wheel offers the advantages of allowing precise motions in both directions of rotation, good strength to size characteristics, and the ability to resist torque created by a load, that is, a worm gear is not back driveable. A first joint 72 joins a palm link 60 and a first finger link 62. A second joint 74 is located at a distal end of the first link 62, joining it and a second link 64. The first joint 72 is preferably disposed above or at the same level as the surface of the palm 20.

In accordance with another aspect of the present invention, the first joint 72 and the second joint 74 are mechanically linked such that changing the angle between a palm link 60 and a first link 62, necessarily changes the angle between a first link 62 and a second link 64 in a fixed manner, without separate actuation means or control signals. Thus, a single grip drive means 50 produces motion in two joints 72,74 by means of joint coupling. This feature can be seen by observing the position of the phantom finger position shown in FIG. 3. Each finger is further preferably equipped with tactile sensor means and feedback means 200 which provide information about an object to be grasped to a hand controller 250. Similarly, as shown in FIGS. 1 and 3, tactile sensor and feedback means 210 may be incorporated into the surface of the palm 20 of the hand of the present invention.

Figure 4:
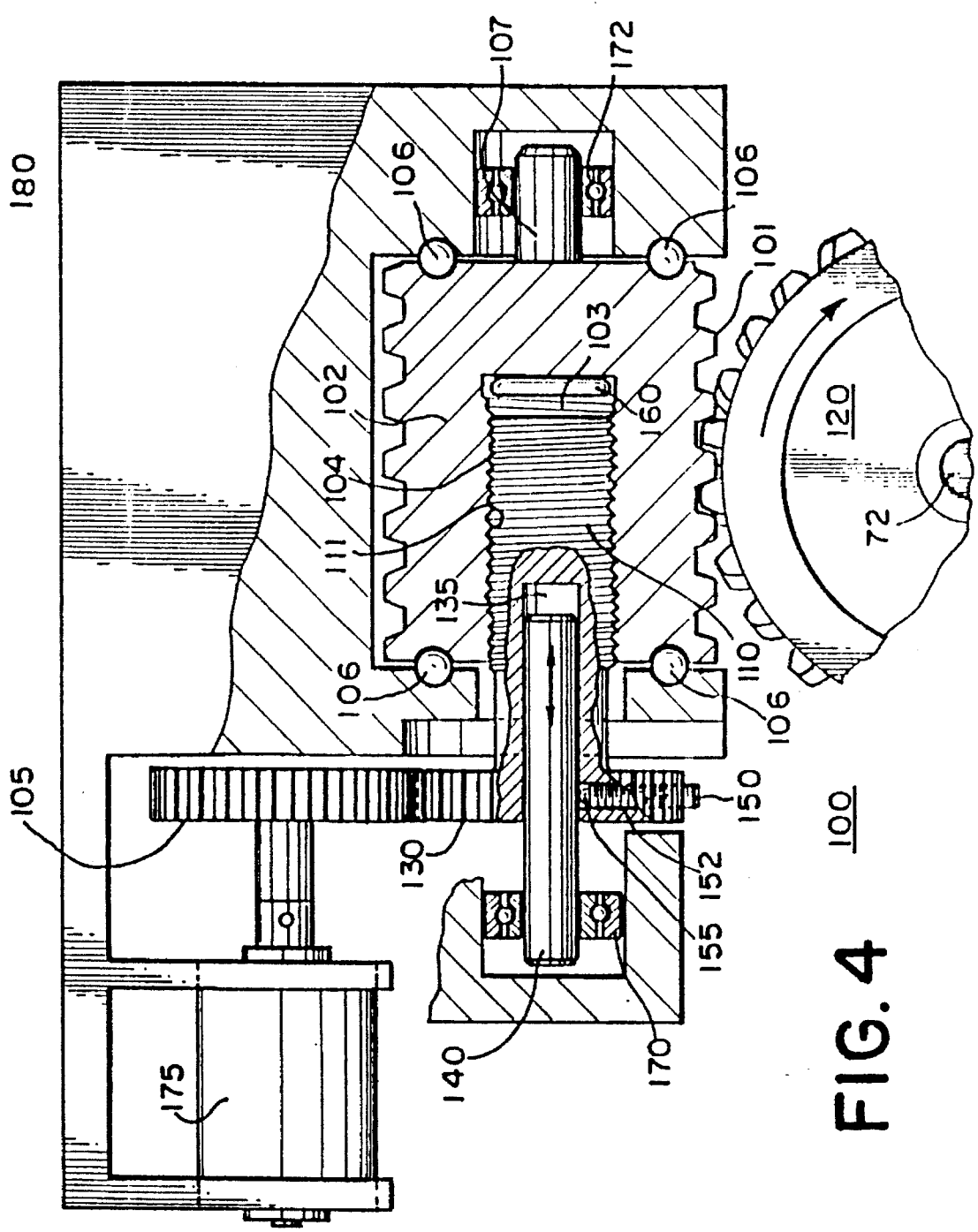
FIG. 4 depicts a partially cross-sectioned side view of a breakaway grip drive means made according to the present invention, taken along lines 4—4 of FIG. 3.

Another important aspect of the present invention is best illustrated in FIG. 4. The grip drive means 50 of each finger 30,40,45 comprises a novel breakaway clutch mechanism shown generally as 100. In a preferred embodiment, the outer body portion 102 of the clutch mechanism 100 is constructed substantially in the shape of a worm gear. Thus, the worm threads 101 engage and interact with the worm wheel 120, which drives a first joint 72 found on each of the fingers 30,40,45.

At a first end of the outer body portion 102 of the clutch mechanism an integral or affixed cylindrical potion 107 is provided which engages a first mounting point and rotating bearing 172. The outer body portion 102 is constrained from axial motion by thrust or axial contact bearings and retainers 106. The necessary points of rigid attachment via which the members of the breakaway clutch 100 are mounted is provided generally by clutch housing 180.

As further seen in FIG. 4, an interior bore 103 within the outer body portion 102 is provided with threads 104. Disposed within the closed end of the threaded bore 103 in outer body portion 102 is a resilient means 160. In a preferred embodiment the resilient means is an O-ring constructed from a resilient material such as rubber, neoprene or silicone. If desired a spring or a Belleville washer may be substituted to function as a means for creating a resistive force proportional to displacement. It is further desirable that the resilient means 160 possess a relatively high spring constant, that is, that a very small displacement will create a relatively large resistive force. As a result the linear difference between the displacement required to generate a small force and the displacement required to generate a large force will be relatively small.

In another embodiment, the outer body potion 102 may have one or more axial slots cut in the walls of the cylinder surrounding the bore 103, providing a device which has positive-locking the properties of a collet. In another variation, the axial bore 103 may be tapered, again providing a substantially "locked" condition when breakaway torque is achieved.

A clutch portion 110 is fitted into threaded bore 103. The clutch portion 110 is fabricated with threads 111 appropriately sized to engage the threads 104 of the bore 103. A first end of the clutch portion 110 is most preferably fabricated substantially in the shape of a spur gear 130, either by integral forming or fixed attachment. The spur gear 130 attached to clutch portion 110 engages with drive gear 105, which transfers input torque to the clutch mechanism 100. The input torque is provided by a drive motor 175 or other means for actuation. It will be understood by those of ordinary skill in the art that any of a variety of suitable power transmission sources may provide this input torque directly or through power transmission apparatus. It will be further appreciated by those of ordinary skill that the spur gears 105,130 can be replaced by any number of means for power transmission, such as belts and pulleys, friction wheels, or chain and sprocket devices.

Within the smooth bore 135 of the clutch portion 110, a shaft 140 is disposed. The shaft 140 and bore 135 are sized so as to provide a sliding fit. An end of the shaft 140 not within the bore 135 is supported by a second mounting point and rotating bearing 170. Thus, the clutch portion 110 is supported on an axis having shaft 140 as its end supported by bearing 170; the other end is supported within outer body portion 102 which is free to rotate on its bearings 106, thereby allowing the entire assembly to rotate and affect the position of the joint 72.

The spur gear 130 which is affixed to the clutch portion 110 has a radially oriented threaded hole 152 extending from its periphery into the smooth bore 135. A set screw 150 having a soft tip 155 is disposed within the radially oriented threaded hole 152. The soft tip is preferably comprised of nylon, but other materials which will create a frictional resistance between the tip 155 and the smooth shaft 140 without damaging the shaft 140 may be substituted. Alternatively, the entire screw 150 may be comprised of such a material. The set screw 150, including the tip 155, is of sufficient length to be easily manipulated after being threaded into the hole 152 to adjust the tip 155 of the set screw 150 to be flush with the surface of the smooth bore 135.

In operation, the clutch portion 110 is first screwed into the outer body portion 102 until contact is made with the resilient means 160. Since increased linear displacement of the resilient means 160 increases the frictional force in the fine threads 104,111, the torque required to screw or unscrew the clutch portion 110 from the outer body portion 102 increases as well. This fact allows a value of breakaway torque to be predetermined by measuring the torque required to screw the clutch portion 110 into the outer body portion 102.

When the spur gear 130 or other means of power transmission causes the clutch portion 110 to rotate in the opposite direction (i.e., unscrew) in order to execute a grasp of an object, one of two situations occurs. First, the external torque resisting the motion of the worm wheel 120 may be sufficient to overcome the frictional force in the screw threads 104,111. This condition will occur when the finger encounters an obstacle which resists further closure. In this situation, the clutch portion 110 will unscrew from the outer body portion 102 and there will be no resultant motion in the worm wheel 120. The device will then be "free", that is, it will have broken away. However, if the external torque resisting the worm wheel 120 is insufficient to overcome the frictional force in the screw threads 104,111, the clutch portion 110 will not unscrew form the outer body portion 102 and they will rotate as a unit with the spur gear 130, resulting in the worm threads 101 causing the worm wheel 120 to rotate.

The operation of the clutch mechanism 100 of the present invention is also regulated by adjustment of the set screw 150. As seen in FIG. 4, the set screw 150 may be adjusted to create a frictional force between the tip 155 and the smooth shaft 140 upon which the clutch portion 110 travels. As the clutch portion is screwed in or out of the outer body potion 102, the frictional force created by the tip 155 will resist this motion. The friction provided by the tip 155 is usually somewhat lower than the initial breakaway torque, but will allow the outer body portion 101 to begin to turn again if the torque resisting the motion of the finger decreases below the level required to overcome the frictional force created by the tip 155. This aspect of the present invention allows the re-coupling of the joint if, for example, the object shifts within the grasp and thus changes the loading condition.

Figure 5:
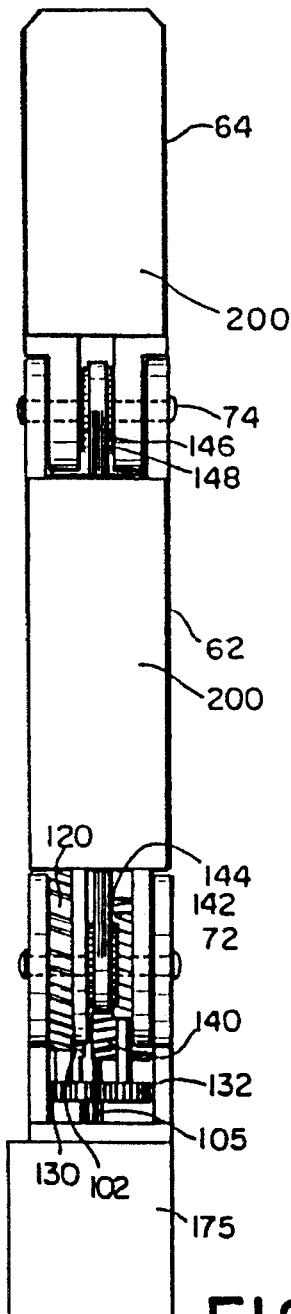
FIG. 5 is a frontal view of the finger depicted in FIG. 3 depicting certain aspects of the joint actuation.

The second joint 74 of each finger 30,40,45 is also driven by actuation means 175, as illustrated by FIG. 5. In accordance with an aspect of the present invention, the spur gear 105 which is attached to the drive motor or actuation means 175 also drives a second spur gear 132, which is attached to a second worm gear 140. This worm gear, in turn, causes a second worm wheel 142 to rotate. A timing belt pulley 144, attached to a second worm wheel 142 also rotates. A timing belt 146 transfers this motive force to a second timing belt pulley 148, which is affixed to the second joints 74. It will be appreciated that the first and second joints are therefore coupled. This coupling dictates that the relative motion between the two joints 72,74 is governed by the relative gear reductions between the worm gears 102, 140 and the worm wheels 120,142. It is understood that conventional pulleys and tendons or other power transmission devices may be substituted for the timing belt 146 and timing belt pulleys 144,148 without affecting the performance of the invention.

In operation, fingers or other articulated devices incorporating the breakaway clutch mechanism 100 of the present invention are first adjusted or "preset" in terms of both relative spatial position and the level of torque at which it is desired the clutch mechanism 100 cease transferring torque to the joint being driven 72 (i.e., the breakaway torque). This is accomplished by first causing the drive motor or actuation means 175 to rotate in a direction whereby the finger being driven is in an open position, or the position to which it is desired to return after any grasp executed is released. After a grasp is executed, the rotation of the actuator 175 is reversed and the clutch portion 110 will be driven back into the outer body portion 102 until it contacts the resilient means 160, at this point the worm threads 101 will engage and turn the worm wheel 120, causing the finger 30,40,45 to release its grasp. Each finger 30,40,45 has an inherent extensional limit stop when the finger is extended until it contacts the structure of the actuator means 50, as shown in FIG. 3.

It will be further appreciated that each finger 30,40,45 constructed in accordance with the present invention is comprised of means which transfer power from a single actuator to first joint 72 and to a second joint 74, however, the relative motion of these two joints is compliantly coupled. The breakaway clutch mechanism 100 described above, provides the fingers 30,40,45 with the ability to "wrap" around an object to be grasped in an autonomous manner, that is, without a separate sequence of directions from the controller 250. This feature greatly simplifies the algorithms necessary to execute grasps and control the single actuator which actuates the fingers. This ability is further useful in executing enveloping grasps. The execution of an enveloping grasp is best visualized by referring to FIG.

3. For an enveloping grasp, stability depends on contact between the object and at least one point on the palmar surface 66,68 of each link 62,64, that is, the contact must be on the inside surfaces of the links 62,64 rather than at the distal end last link 64 (i.e., the fingertip). Enveloping grasps are stronger and more stable since they do not rely on friction for to manipulate an object. For example, the superior stability of an enveloping grasp is seen in the grasp executed by humans when grasping a hammer handle.

The novel clutch mechanism described above provides the compliance required to execute enveloping grasps without prior knowledge of the shape of the object being grasped. As described above, the clutch mechanism 100 has an integral worm gear reduction and stops movement of the first joint 72 at a certain threshold torque. Clutch mechanism 100 also has a inherent memory which causes the joints to always return to the same relative position when fully opened. This is accomplished through the interaction of resilient means 160 disposed within each clutch mechanism. By pre-adjusting the clutch portion 110 using fine threads 111 to an appropriate value of breakaway torque, both the strength of the grasp and the memory function of the clutch mechanism are set.

One of ordinary skill in the art will understand that the breakaway torque is proportional to the motor torque on the fingers when they are fully opened against their stops, and can be changed before each grasp. This feature allows a hand utilizing these fingers to pick up fragile objects such as eggs or light bulbs and still possess the robustness to manipulate a tool such as a hammer.

In operation, each finger will be "open" as shown in FIG. 3, and be moved toward the "closed" position, as shown in phantom. When there is no contact between the finger and the object, both joints will move in a relationship defined by their relative gear reductions. When the first joint 72 of a finger requires a joint torque with a value higher than the pre-set breakaway torque, it decouples from the drive motor or actuator means 175. The decoupled finger will passively maintain this position and this torque value because of the non-back driveable worm gear reduction. The second joint 74 of a finger which has encountered a torque greater than the breakaway torque will remain coupled to the finger actuator and continue to rotate. If the object shifts within the grasp and the torque encountered by the first joint 72 of a finger falls below the torque created by the screw 152, the first joint 72 will resume coupling with the actuator 175 and move until the breakaway torque is encountered again.

Two of the many advantages of the finger used in the present invention will be immediately evident to those of ordinary skill in the art. First, multiple contacts between the palmar surfaces of the finger and the object being grasped will occur with most objects. Second, after decoupling ("breakaway"), the torque around the second joint 74 can be actively controlled. Before the threshold breakaway torque value is encountered by the first joint 72 of a finger, the joint torques are indeterminate, and can only be related by the single equation:

$$\frac{t_1}{G_1} + \frac{t_2}{G_2} = t_{motor}$$

where $t_1$ and $t_2$ represent the torques at joints 1 and 2, $G_1$ and $G_2$ represent the gear reductions for joints 1 and 2, and $t_{motor}$ represents the torque provided by the drive motor or actuator means 175. After the first joint 72 of a finger has encountered a torque greater than the breakaway value, the torque encountered by each joint is defined by the following equations:

$$t_1 = t_{break} \qquad t_2 = G_2 \left[ t_{motor} - \frac{t_{break}}{G_1} \right]$$

Where $t_{break}$ is the torque created by the setscrew 152. Thus, it can be seen that after breakaway, the torque around the second joint 74 can be independently controlled by varying the output torque of the motor 175, which is the only variable in the equation for $t_2$.

A further advantage of the clutch mechanism disclosed in a preferred embodiment of the present invention is the use of a non-backdriveable worm gear train 101,120 as a means of power transmission. As a result, large contact forces are resisted to the limit of the strength of the materials used in construction of the hand. The use of enveloping grasps allows the hand of the present invention to pick up relatively heavy objects, which tend to produce high joint torques. If the power transmission means were backdriveable, much larger actuator motors would be required to resist these high joint torques. Since the actuator motors used by the fingers disclosed by the present invention can be smaller and lighter than those of previous designs having similar capacities, they are mounted at the base of each finger. As discussed above, each actuator 175 directly drives two worm gears, 102,140 and as a result undesirable backlash is minimized. The timing belt 146 which drives the second joint 74 is the only component with any inherent elasticity, which is reduced by it short length. Alternate embodiments utilize conventional tendons or other means of power transmission to further alleviate this condition. The present invention allows an accurate servo control loop to be closed around the motor. The overall result is a finger actuation system with minimal error in the transmission of power.

Another advantage of mounting the actuator motors at the finger base is that all four motors may be mounted under the palm. As seen in FIG. 1, sensor and power cables 240 are terminated by connectors 230 also located under the palm. The result is a self-contained unit which can be quickly attached to or removed from the robot arm and the control system. This is an important advantage if the robot arm to which the end effector of the present invention is attached is intended for use with multiple end effectors. This is also an important advantage if repairs to the robotic arm or end effector are undertaken, or when one end effector is to be used in conjunction with different robotic arms.

Figure 6:
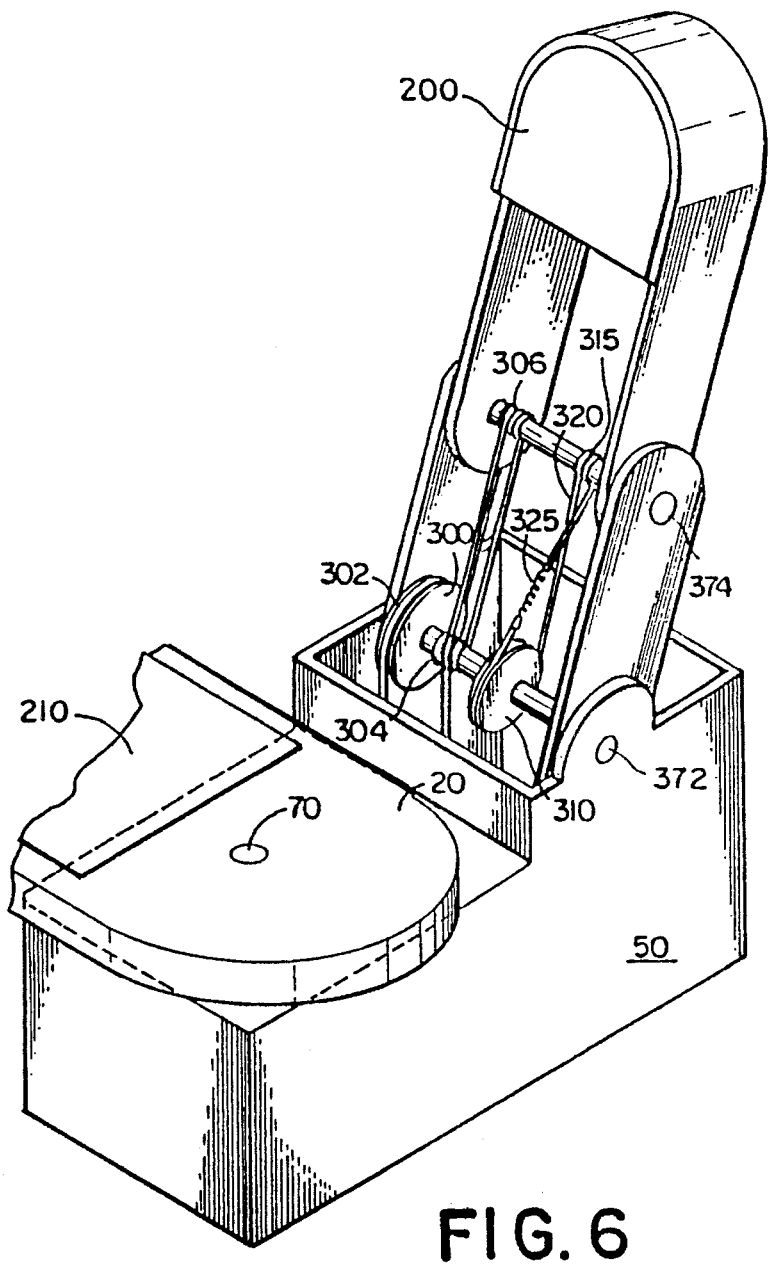
FIG. 6 shows another embodiment of the finger of the present invention.

Another embodiment of a compliant finger made in accordance with the present invention is illustrated in FIG. 6. The finger includes first and second rotatable joints 372,374, both of which are preferably disposed above or at the same level as the surface of the palm 20. It can be seen that two joints 372,374 are joined by compliant tendon 320. The compliant tendon 320 has a compliant section 325. The compliant section 325 is preferably a spring or a section of elastic material sufficient design such that the load encountered during operation is less than the elastic limit of the spring or material. An advantage of the tendon arrangement shown is that the tendon provides compliance to the joint only upon closing. The finger illustrated uses an actuator 50 to drive the joints 372,374 in a manner similar to that described above however, power is transferred from the actuator via drive tendon 302 to a pulley 300 which is free to rotate about a first joint 372. Another pulley 304 is affixed to the drive pulley 300, which through a tendon 330, actuates the a second joint 374. The rotation of a second joint 374 causes a pulley 315, which is affixed thereto to rotate the rotation of this pulley causes the compliant tendon 320 to wind or unwind about a fixed pulley 310 which does not rotate, thereby causing motion about the first joint 372.

Thus, the motion of the first joint is dependent on the actuation of the second joint and the relative angular displacements between the joints is governed by the relative ratios between pulley diameters. The compliant section 325 allows the second joint to continue to travel once the first joint has encountered a resistive force. The magnitude of the resistive force which stops the motion of the first joint is controlled by the spring constant of the compliant section 325. Thus, although the relative motion of the two joints is coupled, it is a compliant coupling. One of ordinary skill in the art will be able to construct numerous variations of the cable routing disclosed and may add further links at either the base or proximal ends of the articulated member described.

An advantage of compliantly coupled joints, as pointed out above, is that they conform to the shape of objects. If the joints were rigidly coupled, as proposed by U.S. Pat. No. 4,865,376—Leaver et al., referenced above, a single set of joint angles would be defined for each increment of joint displacement. Therefore, one of ordinary skill in the art will appreciate that fingers having rigidly coupled joints will contact an object to be grasped with at least two palmar surfaces only when the shape object is within a small set of shapes. In practice, most objects will contact the palmar surfaces of such rigidly coupled fingers at a single point. If, however compliance is built into the tendon, the finger will wrap around the object and ensure at least one contact on the inside surface of at least two different planar surfaces. Since the tendon routing of the finger illustrated is compliant only in closing, large contact forces can be exerted. However, while the compliant tendon disclosed eliminates the disadvantages of rigidly coupled joints and allows multiple contact points, it will be appreciated that the addition of compliance itself may affect the stability of certain grasps.

Figure 7:
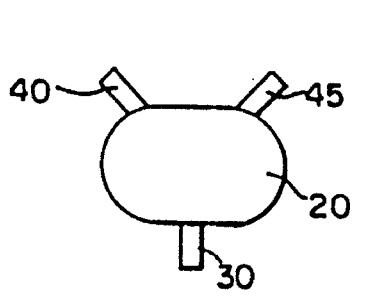
FIG. 7–7D are schematic representations of the various grasping modes which may be achieved by the hand of the present invention.
Figure 7A:
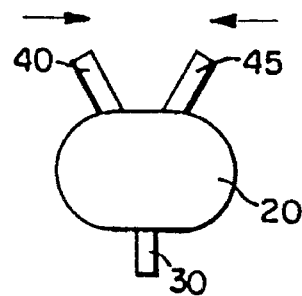
Figure 7B:
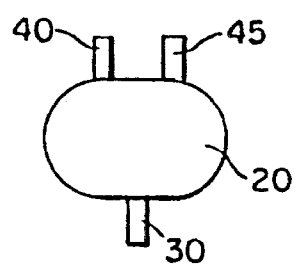
Figure 7C:
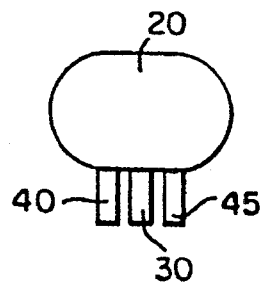
Figure 7D:
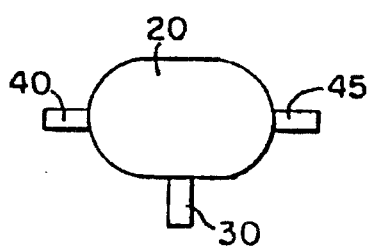

As illustrated diagrammatically by FIGS. 7–7D, another aspect of the present invention is the novel configuration of the palm 20 and fingers 30,40,45. In a preferred embodiment one finger 30 is stationary and does not rotate about its palm axis 70. However, two fingers rotate in equal an opposite directions; the rotational motion of these fingers is driven by a single actuator 80. Therefore, the palm/finger relationship of the present invention constitutes a one degree of freedom of movement about the palm 20. This configuration permits the palm 20 to interact with the fingers 30,40,45 and be used as a tool in the manipulation of objects. Thus the palm 20 is used not only as a base to hold objects against or as a surface to push objects, but also, by incorporating tactile sensors 210, as an information-gathering instrument to obtain the "footprints" of objects. The tactile sensors 210 located on the surface of the palm 20 transmit information about the location of point contacts with an object to the controller 250, in a manner compatible with the information transmitted by the sensors 200 located on the palmar surfaces of the fingers 30,40,45, as shown in FIG. 3. The information gathered thus allows the palm and fingers to act in concert and firmly grasp irregularly shaped objects without first being programmed or otherwise provided with information about the object's shape.

As seen in FIGS. 7–7D, the preferred palm/finger configuration of the present invention permits a wide variety of end effector grasping modes. FIG. 7A illustrates a pinch grip, which occurs when the rotating fingers 40,45 are brought together on the opposite side of the palm from the stationary finger 30, as shown by the arrows. The inside of these two fingers are used in friction grasping, in a manner similar to that used by amputees with a split hook. This is primarily a precision grasp which may be used for picking up small objects. Another grasp configuration is illustrated in FIG. 7B is the cylindrical grasp. This occurs when the two moveable fingers 40,45 are opposite the stationary finger 30. Because the stationary finger can pass between the moveable fingers, this mode allows for the apprehension of a large range of shapes and sizes, from small cylindrical objects to larger rectangular box-shaped objects. In the spherical grasp, illustrated by FIG. 7, the fingers 30,40,45 are configured to be about 120° apart. In a power grasp the palmar surfaces of the fingers are used to hold a spherical object against the palm, while in a precision grip, the three fingers form a three-sided fingertip grasp, similar to the manner in which a drill chuck contacts a bit. Another grasping configuration is obtained by rotating two fingers 40,45, as shown in FIG. 7D, until they are opposite each other. The tip grasping mode can then be used to manipulate an object. Although this grasp relies on friction for stability, it is useful for apprehending objects that are awkwardly placed, or for manipulating small objects. Finally, as shown in FIG. 7C, the hook mode of grasping uses all three fingers together on one side of the palm. This allows for two types of grasping: a passive grip on a handle or similar structure where the fingers act as a hook, or an active grasp where all three fingers hold an object against the palm. This grasp is useful for lifting one side of a large flat object, such as a table, in cooperation with another hand, where the size of the object precludes an enveloping grasp.

Another important aspect of the present invention is the control of the apparatus described above. The novel features of the various aspects of the apparatus of the present invention are preferably combined in a hand assembly 10 illustrated in FIG. 1. The control of a hand made in accordance with the present invention is greatly simplified due to the incorporation of mechanical intelligence into the hand itself, which alleviates a great deal of the computational overhead normally associated with hands capable of executing articulated motions and enveloping grasps. A schematic depiction of a preferred grasp planning algorithm is illustrated in FIG. 8.

Figure 8:
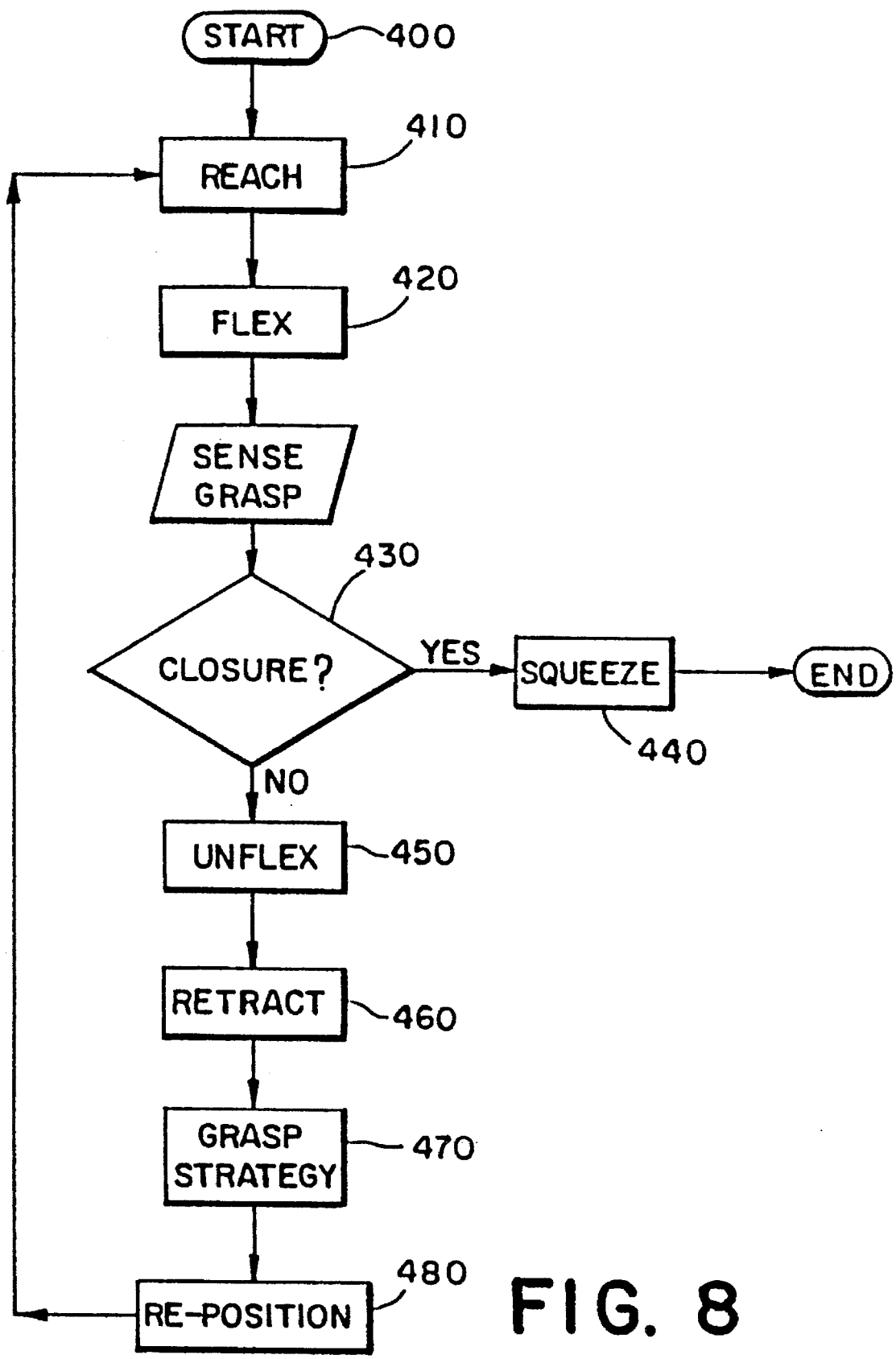
FIG. 8 is a diagrammatic representation of a method of grasping an object utilizing the concepts of the present invention.

The basic objective of the algorithm illustrated in FIG. 8 is to implement a grasping by probing philosophy and thus keep the planning simple. Research has shown that it is necessary to use active sensors to supplement information provided by remote sensors such as vision or laser range finding systems. In addition, human psychological research has defined a number of exploratory procedures which require the stable apprehension and movement of objects to determine such structural properties as weight and volume. See, Ulrich, N. and V. Kumar, "Grasping Using Fingers with Coupled Joints", Proceedings of the 20th Biennial ASME Mechanisms Conference, Orlando Fla., September 1988, which is incorporated herein by reference. In situations where there is little prior knowledge of the characteristics of an object, it is not possible to implement sophisticated grasp planning routines which require detailed information about the object to be grasped in order to calculate the positions at which the fingers will contact the object.

Fingers made in accordance with certain aspects of the present invention and other types of fingers will passively shape themselves to an object. A stable grasp may therefore be obtained with little more than an approximate spatial location. The iterative nature of this algorithm allows the manipulator and control system to learn about the shape of the object to be grasped by processing and combining contact information collected during successive grasps.

Referring now to FIG. 8, the grasp planning algorithm begins at an appropriate staring location 400. At this point, the control system will position the manipulator and set the fingers to an appropriate position from which the execution of the grasp may begin. The first control primitive 410 is labeled "REACH". When this primitive is executed, the robotic arm is moved until the palm contacts an object. This primitive relies primarily upon the manipulation and control ability of the robotic arm to execute gross manipulation. The robot arm controller executes these movements based upon information provided by tactile sensors located on the palm surface to sense contact with the object.

The hand controller begins to execute the actual grasping phase in the second control primitive 420 "FLEX". The execution of this primitive involves closing the fingers until contact is made with a the links connecting a specified number of joints. In a preferred embodiment, the grasp planning algorithm illustrated is used with a hand made in accordance with the present invention. Therefore, the fingers are closed until contact is made with both the link connecting the palm and the first joint, as well as the link which comprises the finger "tip", which is connected to the second joint. The controller is programmed to recognize that contact with the distal link of a finger can indicate several undesirable conditions such as that the object is too far away or too small to allow a stable enveloping grasp to be executed. At this stage, the had controller and the arm controller interact to keep the joint angles nearly equal, thereby centering the object within the grasp of the hand. The first decisional step of the preferred algorithm is shown as the third control primitive 430 "CLOSURE". CLOSURE is a boolean function which incorporates the computation required to determine whether of not a stable grasp can be obtained. For a discussion of the parameters involved in determining the stability of a closure, see Ulrich, N. and V. Kumar, "Grasping Using Fingers with Coupled Joints", Proceedings of the 20th Biennial ASME Mechanisms Conference, Orlando Fla., September 1988, which is incorporated herein by reference. This portion of the algorithm also computes the torques required to maintain this grasp. If a grasp falls within pre-determined parameters which define stability, the algorithm executes the fourth control primitive 440 "SQUEEZE", which increases the torques of the motors to those required to maintain this grasp. After the SQUEEZE primitive is executed, the grasp algorithm is complete and the hand controller awaits another command. If, however, the grasp is determined not to be sufficiently stable, the fifth control primitive 450 "UNFLEX" is executed and the fingers of the hand are returned to their original, open position. Finally, after UNFLEX is executed, the sixth control primitive 460 "RETRACT" is executed. During RETRACT the arm moves away from the object to be grasped. This control primitive, like REACH, relies mainly upon the control and motion capabilities of the arm to which the hand is attached.

The iterative nature of the type of grasp strategy contemplated by the methods of the present invention may be seen by referring to the step 470 labelled "GRASP STRATEGY". This step contains a predetermined course for the robot arm and hand to follow for its next attempt at executing a grasp. The computations carried out may use the information gathered during previous grasp attempts, stored information about the object or the task undertaken, or, most simply, may realign the arm to a predetermined new location. For example, in a preferred embodiment, after the RETRACT primitive is executed the angle of approach taken by the arm is altered fifteen degrees. After the computations and commands of GRASP STRATEGY have been executed, the block of commands labelled REPOSITION 480 causes the arm to be placed in a position to begin the next grasp sequence. The algorithm is reset, as shown by the arrows, to the REACH primitive, and a stable grasp is again sought. Various iterative grasps, though each unstable add to the level of information concerning the spatial characteristics and orientation of the object to be grasped. This information may be processed to provide either further grasping strategies, or be stored and incorporated into further instructions at a later time. For example, the information obtained about a part may help orient the part for further assemble after it has been grasped.

Those of ordinary skill in the art will realize that although certain embodiments have been described with particularity, other embodiments employing the spirit of the present invention are possible. The present invention is not limited in terms of size or number of fingers, as many of the novel concepts disclosed herein are applicable to a wide variety of configurations. The novel clutch mechanism disclosed herein is similarly not limited to the relative size and applications disclosed.

What is claimed is:

1. Apparatus for grasping an object, comprising:
   (a) a palmar surface comprising a grasping surface and a perimeter;
   (b) a first articulated member comprising a grasping surface, the member attached to said palmar surface by a grip drive having an axis of rotation, wherein the grasping surface of the member is displaced from the axis of rotation and the axis of rotation is attached to the palmar surface at a point inward from the perimeter of the palmar surface, and wherein the articulated member further comprises at least a first and a second rotatable joint, wherein both of the rotatable joints are disposed above the grasping surface of the palmar surface at all times, and the axis of rotation of the first articulated member is fixed at a first position and placed to allow a range of motion of at least 90°, and wherein said articulated member is moveable relative to the perimeter;
   (c) means for actuating said articulated member in coordination with said palmar surface by rotating the first and second rotatable joints and by moving the grip drive about the axis of rotation; and
   (d) a non-rotatable stationary member affixed to the palmar surface, and comprising a grasping surface, whereby the articulated member and the stationary member can selectively cooperate to grasp an object between them and can selectively be positioned so that a respective grasping surface of each of them is coplanar and can be used to execute a grasp.

2. The apparatus of claim 1 further comprising:
   (e) tactile sensor means for sensing the location of a force exerted against said palmar surface and the grasping surface of said articulated member, the sensor disposed at a plurality of locations upon said surfaces.

3. The apparatus of claim 1, wherein the stationary member comprises an articulated member.

4. The apparatus of claim 1, further comprising at least a second articulated member attached to said palmar surface by a grip drive having an axis of rotation fixed to the palmar surface, wherein the second articulated member comprises a grasping surface displaced from the axis of rotation and wherein the second articulate member is attached to the grip drive at a point inward from the perimeter of the palmar surface, the axis of rotation of the second articulated member fixed at a second position, and placed to allow a range of rotation of at least 90°, wherein said articulated members are moveable relative to the perimeter of said palmar surface, whereby the distance between the first and second position permits each of the articulated members to be rotated until their respective grasping surfaces and the grasping surface of the stationary member are coplanar and can be used to execute a grasp.

5. The apparatus of claim 4, further comprising an actuation and linkage system, whereby the motion of said articulated members relative to said palmar surface is equal and in opposite directions along the perimeter of the palmar surface.

6. The apparatus of claim 4, wherein the substantially stationary member comprises an articulated member affixed to a point on the palmar surface in a substantially non-rotatable manner.

7. The apparatus of claim 1, wherein said first articulated member is comprised of:

(a) means for rotating the first rotatable joint;

(b) a first link, having two ends, a proximal end of said first link hingably attached to said first rotatable joint, a distal end of said link defining the second rotatable joint;

(c) a second link, having two ends, a proximal end of said link hingably attached to said second rotatable joint;

(d) means for transferring rotation from the first rotatable joint to the second rotatable joint; and (e) a tendon connected to the first and second rotatable joints.

8. The articulated member of claim 7, wherein said means for actuating said first and second joints is comprised of a tendon and pulley.

9. The apparatus of claim 7, wherein the substantially stationary member comprises an articulated member affixed to said palmar surface in a substantially non-rotatable manner, and at least a second articulated member rotatably attached to said palmar surface, the axes of rotation of said first and second articulated members fixed at first and second position, respectively, and placed to allow said first and second articulated members to be moved relative to the perimeter of said palmar surface; whereby the distance between the first and second position permits each of the articulated members to move to a position adjacent the stationary member, whereby the grasping surfaces of the member are coplanar.

10. The apparatus of claim 9, wherein each of said articulated members is comprised of:

(a) means for rotating a first rotatable joint;

(b) a first link, having two ends, a proximal end of said first link hingably attached to said first rotatable joint, a distal end of said link defining a second rotatable joint;

(c) a second link, having two ends, a proximal end of said link hingably attached to said second rotatable joint;

(d) means for transferring rotation from the first rotatable joint to the second rotatable joint; and (e) a tendon connecting the first and second rotatable joints.

11. The apparatus of claim 10, further comprising at least a compliant section for compliantly coupling the motion of the first and second rotatable joints.

12. The apparatus of claim 7, wherein the tendon comprises at least a compliant section for compliantly coupling the motion of the first and second rotatable joints.

13. The apparatus of claim 12, further comprising a resilient device affixed to the compliant tendon, wherein the compliant coupling is provided by the resilient device.

14. An end effector comprising a palm; a stationary grasping member; and an articulated finger comprising two or more rotatable joints, the finger connected to the palm at a point inward from an edge of the palm to define an axis of rotation fixed in a position and placed to allow a range of motion of at least 180° around the perimeter of the palm, wherein said articulated finger is moveable relative to the perimeter of the palm wherein the finger can be moved to a position adjacent the grasping member so that a grasping surface of articulated finger and the grasping member are in the same plane and can be used to execute a grasp.

15. The end effector of claim 14, comprising a second articulated finger comprising two or more rotatable joints.

16. The end effector of claim 15, wherein both articulated fingers are connected to the palm at spaced apart points so that each of the articulated fingers can be moved about 180° around the palm, whereby all three fingers can be moved to a position adjacent one another so that a grasping surface of each articulated finger is in the same plane and can be used to execute a grasp.

17. An end effector comprising a palm; and two articulated fingers connected to the palm at an axis of rotation inward from an edge of the palm placed to allow a range of motion of at least 180° around the palm, wherein the articulated fingers are moveable relative to the perimeter of the palmar surface, the articulated fingers each comprising two or more rotatable joints disposed above the palm whereby the articulated fingers can be moved to a position adjacent one another so that a grasping surface of each articulated finger is in the same plane and can be used to execute a grasp.

* * * * *

UNITED STATES PATENT AND TRADEMARK OFFICE
CERTIFICATE OF CORRECTION

PATENT NO. : 5,501,498
DATED : March 26, 1996
INVENTOR(S) : Nathan T. Ulrich

It is certified that error appears in the above-indentified patent and that said Letters Patent is hereby corrected as shown below:

Cover page, Item No. [63], line 1, change "63,125" to --63,126--;

Cover page, Item No. [56] References Cited, U.S. Patent Documents, delete entire line beginning with "3,927,1424...";

Cover page, Item No. [56] References Cited, U.S. Patent Documents, last reference, change "Bartholet" to --Bartolet--;

Column 5, line 38, change "$\leqq$" to --$\leq$--.

Signed and Sealed this

Twenty-sixth Day of January, 1999

Attest:

Attesting Officer

*Acting Commissioner of Patents and Trademarks*